US011614000B1

(12) United States Patent
Kim

(10) Patent No.: US 11,614,000 B1
(45) Date of Patent: Mar. 28, 2023

(54) TURBOCHARGER SYSTEMS AND METHODS

(71) Applicant: ADP Distributors, Inc., Surrey (CA)

(72) Inventor: Jay Young Kim, Langley (CA)

(73) Assignee: ADP Distributors, Inc., Surrey (CA)

( * ) Notice: Subject to any disclaimer, the term of this patent is extended or adjusted under 35 U.S.C. 154(b) by 0 days.

(21) Appl. No.: 17/663,516

(22) Filed: May 16, 2022

(51) Int. Cl.
*F01D 25/16* (2006.01)
*F01D 25/24* (2006.01)
*F02C 6/12* (2006.01)

(52) U.S. Cl.
CPC .......... *F01D 25/162* (2013.01); *F01D 25/24* (2013.01); *F02C 6/12* (2013.01); *F05D 2220/40* (2013.01); *F05D 2240/50* (2013.01); *F05D 2260/31* (2013.01); *F05D 2260/36* (2013.01)

(58) Field of Classification Search
CPC .......... F01D 25/162; F01D 25/24; F02C 6/12; F05D 2220/40; F05D 2240/50; F05D 2260/31; F05D 2260/36
See application file for complete search history.

(56) References Cited

U.S. PATENT DOCUMENTS

| | | | |
|---|---|---|---|
| 4,652,219 A | 3/1987 | McEachern et al. | |
| 4,902,144 A * | 2/1990 | Thoren | F01D 25/166 384/551 |
| 5,076,766 A | 12/1991 | Gutknecht | |
| 5,253,985 A | 10/1993 | Ruetz | |
| 8,602,652 B1 | 12/2013 | Bradshaw | |
| 2006/0188185 A1 | 8/2006 | Mavrosakis | |
| 2007/0134106 A1 | 6/2007 | McKeirnan | |
| 2008/0019629 A1 * | 1/2008 | McKeirnan | F16C 19/548 384/493 |
| 2008/0267548 A1 | 10/2008 | Chriss | |

* cited by examiner

*Primary Examiner* — Loren C Edwards
*Assistant Examiner* — Edward Bushard
(74) *Attorney, Agent, or Firm* — Schacht Law Office, Inc.; Michael R. Schacht

(57) ABSTRACT

A support assembly for a turbocharger defining a system axis, the support assembly comprising a housing assembly and a bearing assembly. The housing assembly comprises a housing defining at least one support groove and a seal plate. The bearing assembly comprises an outer sleeve defining at least one support tab. The at least one support tab is sized and dimensioned such that, when the outer sleeve is supported by the housing member in a desired orientation, the support tab is within the support groove such that movement of the outer sleeve along the system axis relative to the housing member is inhibited. The seal plate may be configured to define at least one anti-rotation projection arranged relative to the support tab to inhibit rotation of the outer sleeve about the system axis relative to the housing member.

17 Claims, 8 Drawing Sheets

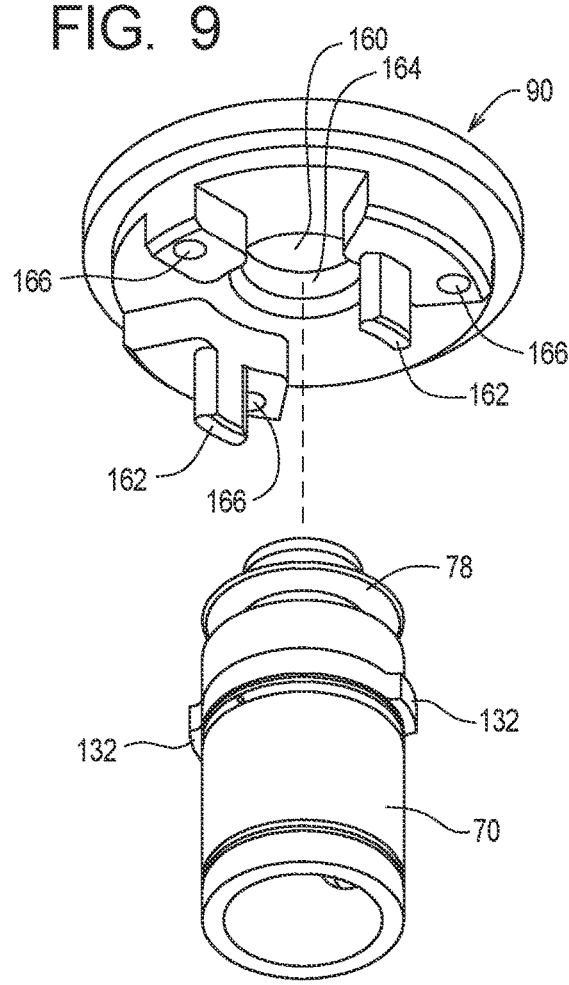
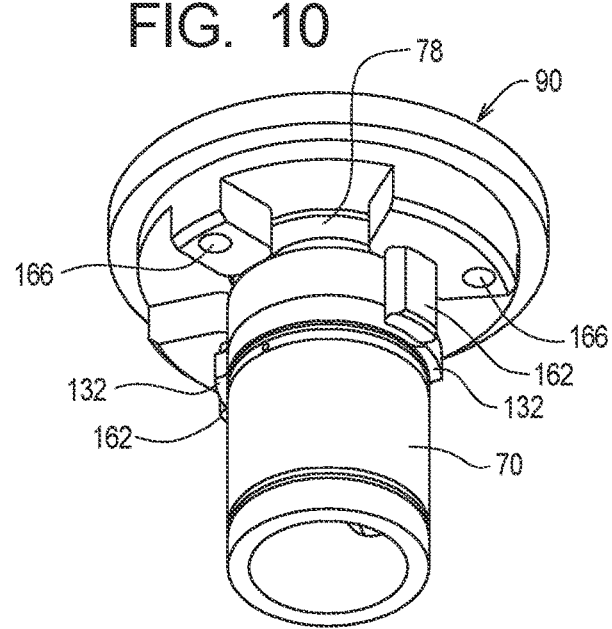
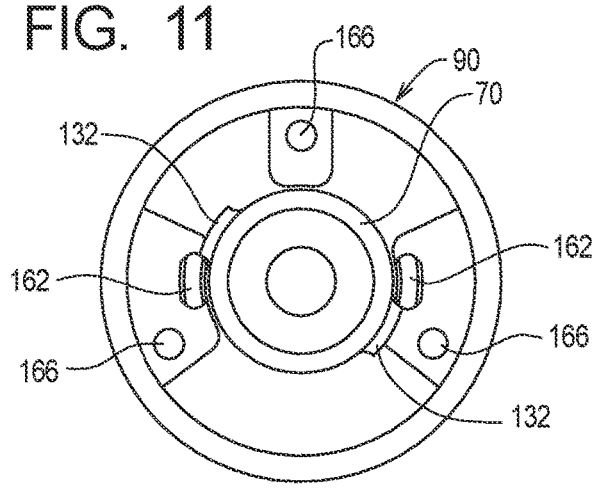

US 11,614,000 B1

TURBOCHARGER SYSTEMS AND METHODS

TECHNICAL FIELD

The present invention relates turbochargers for internal combustion engines and, more particularly, to center housing rotating assemblies for turbochargers configured to allow efficient and reliable fabrication and assembly of turbochargers.

BACKGROUND

Turbochargers are often used to increase the power output of an internal combustion engine using energy from engine exhaust gas to compress engine intake air. A turbocharger typically comprises a turbine wheel, a compressor wheel, and a shaft rigidly connecting the turbine wheel to the compressor wheel. The turbine wheel is supported within the engine exhaust gas stream such that movement of the engine exhaust gas causes axial rotation of the turbine wheel about a shaft axis. The shaft translates axial rotation of the turbine wheel to the compressor wheel. The compressor wheel is in turn supported such that axial rotation of the compressor wheel compresses the engine intake air.

The moving components of a turbocharger (e.g., turbine wheel, compressor wheel, and shaft) must thus be supported for rotation at high speed. Accordingly, a turbocharger further typically comprises a housing and bearing assembly to engage the shaft to maintain the turbine wheel and compressor wheel in desired orientations relative to the exhaust gas stream and intake air stream. Further, turbochargers may also comprise an oil injection system for injecting oil for lubrication and/or cooling purposes.

The individual parts of a turbocharger are typically fabricated from metal. And because of the relatively high rotation speeds associated with turbochargers, manufacturing tolerances must be tight, and assembly errors can adversely affect the operation of the turbocharger. The fabrication and assembly of turbochargers can thus be expensive.

The need thus exists for improved turbocharger systems and methods that may be fabricated and assembled efficiently and reliably.

SUMMARY

The present invention may be embodied as a support assembly for a turbocharger defining a system axis. The support assembly of the present invention comprises a housing assembly and a bearing assembly. The housing assembly comprises a housing defining at least one support groove and a seal plate. The bearing assembly comprises an outer sleeve defining at least one support tab. The at least one support tab is sized and dimensioned such that, when the outer sleeve is supported by the housing member in a desired orientation, the support tab is within the support groove such that movement of the outer sleeve along the system axis relative to the housing member is inhibited.

The present invention may be embodied as a support assembly for a turbocharger defining a system axis. The support assembly of the present invention comprises a housing assembly and a bearing assembly. The housing assembly comprises a housing defining at least one tab locating groove and a seal plate defining at least one anti-rotation projection. The bearing assembly comprising an outer sleeve. The at least one anti-rotation projection is sized and dimensioned such that, when the seal plate is secured to the housing member, the anti-rotation projection is arranged to inhibit movement of the outer sleeve relative to the housing member such that rotation of the outer sleeve about the system axis relative to the housing member is inhibited.

The present invention may also be embodied as a method of forming a support assembly for a turbocharger defining a system axis, the method comprising the following steps. A housing is provided, and at least one support groove is formed in the housing. A bearing assembly comprising an outer sleeve defining at least one support tab is provided. The bearing assembly is arranged within the housing. A seal plate is secured to the housing such that, when the outer sleeve is supported by the housing member in a desired orientation, the support tab is within the support groove and movement of the outer sleeve along the system axis relative to the housing member is inhibited.

DESCRIPTION OF DRAWING

FIGS. 9 and 10 are bottom perspective views illustrating assembly of an outer sleeve, shaft collar, and seal plate of the first example center housing rotating assembly; and FIG. 11 is a bottom plan view illustrating the assembled outer sleeve, shaft collar, and seal plate.

DETAILED DESCRIPTION

Figure 1:
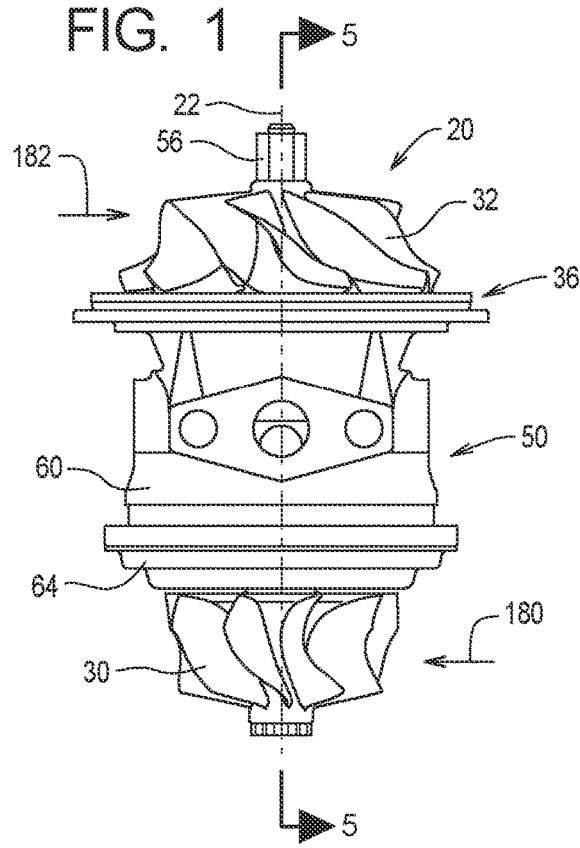
FIG. 1 is a first side elevation view of a first example center housing rotating assembly for turbocharger system of the present invention.
Figure 2:
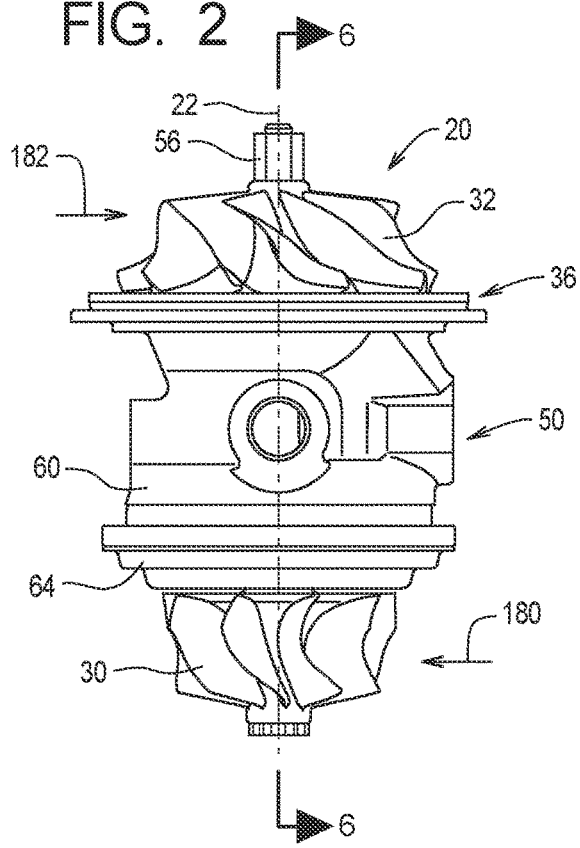
FIG. 2 is second side elevation view of the first example center housing rotating assembly.
Figure 3:
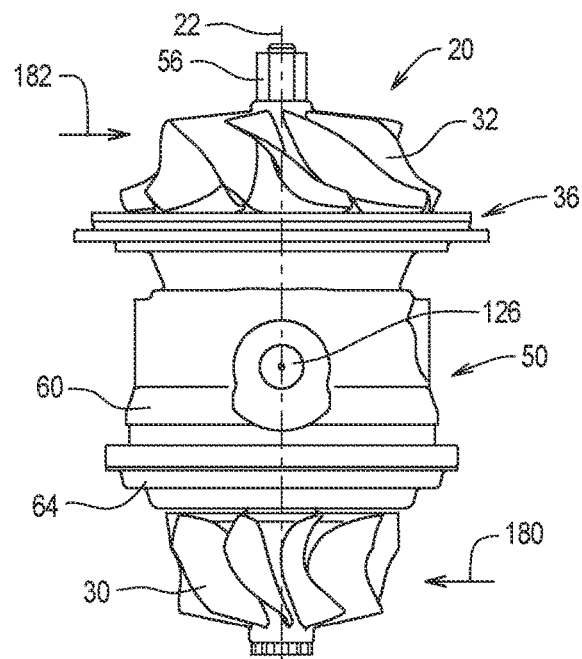
FIG. 3 is third side elevation view of the first example center housing rotating assembly.
Figure 4:
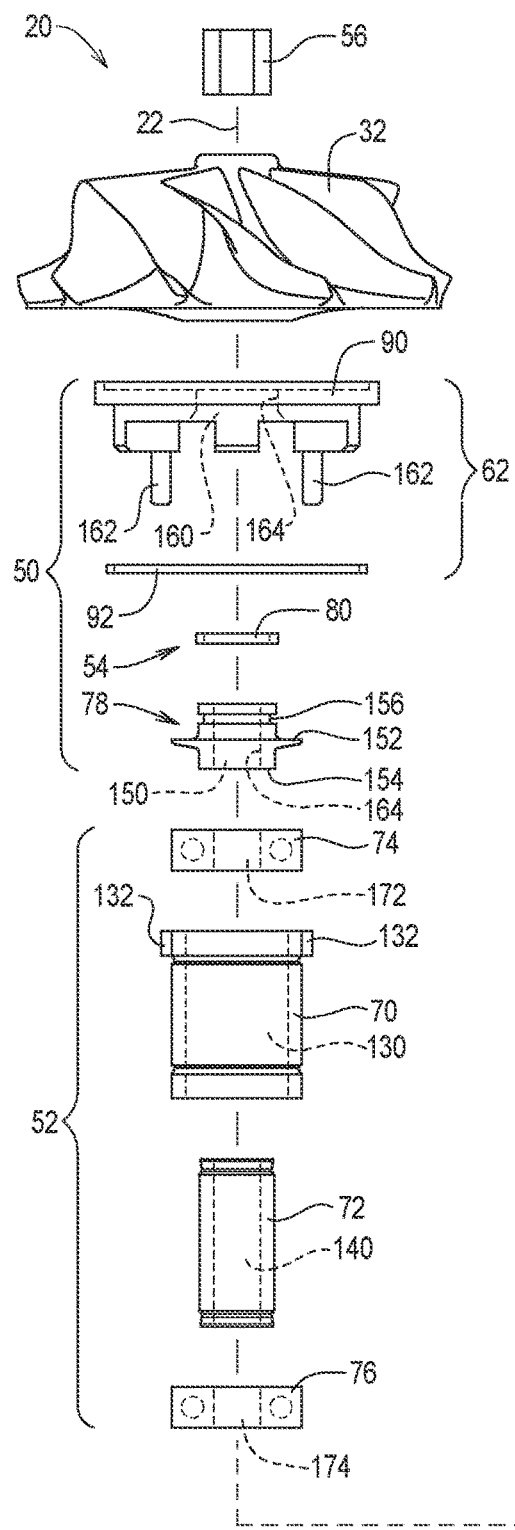
FIG. 4 is a side elevation exploded view of the first example center housing rotating assembly.
Figure 4:
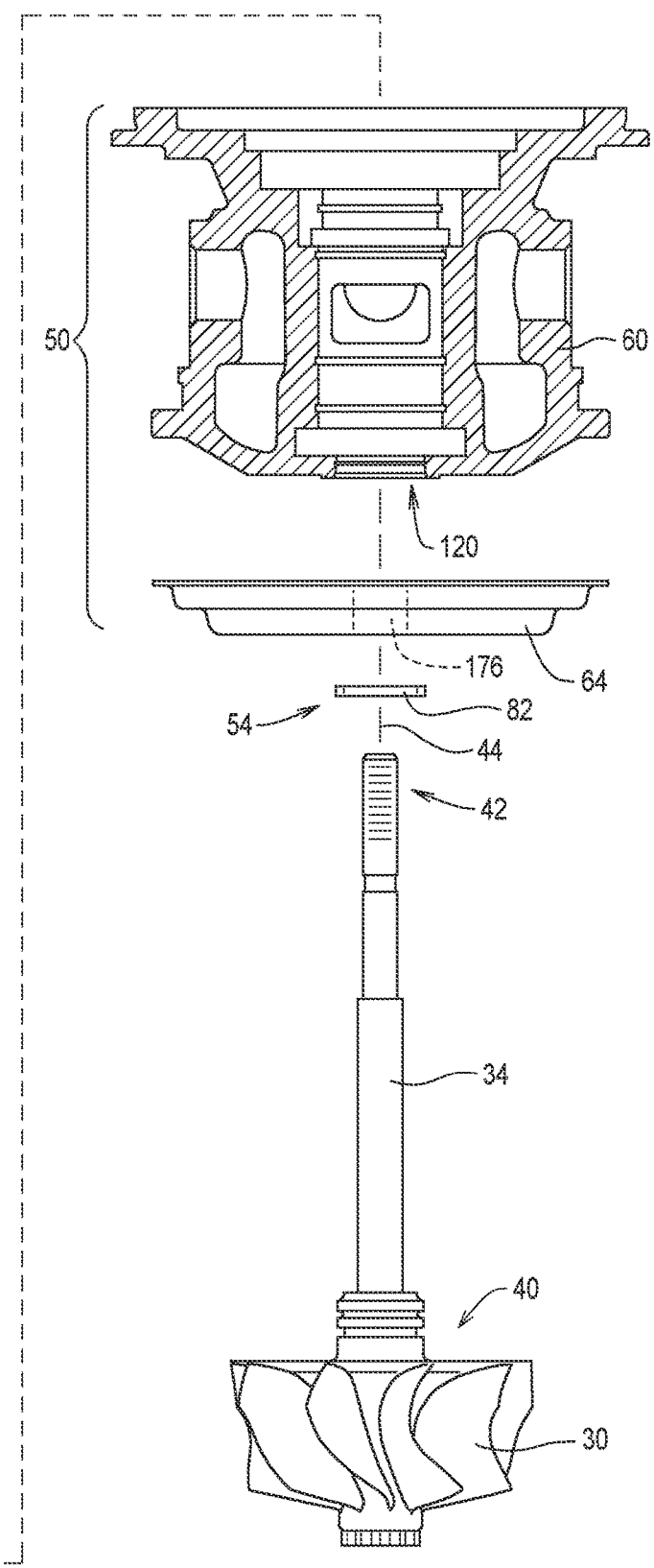

FIGS. 1-6 illustrate a first example center housing rotating assembly 20 for a turbocharger system, the first example center housing rotating assembly 20 constructed in accordance with, and embodying, the principles of the present invention. The first example center housing rotating assembly 20 defines a system axis 22 and comprises a turbine wheel 30, compressor wheel 32, a shaft 34, and a support assembly 36. The example shaft 34 defines a shaft base portion 40, a shaft tip 42, and a shaft axis 34. The turbine wheel 30, compressor wheel 32, and shaft 34 are or may be conventional and will not be described herein beyond that extent helpful to a complete understanding of the present invention.

The example support assembly 36 comprises a housing assembly 50, a bearing system 52, a shaft seal system 54, and a shaft nut 56. The example housing assembly 50 comprises housing 60, a seal plate assembly 62, a heat shield 64, and at least one seal plate bolt 66. The example bearing system 52 comprises an outer sleeve 70, an inner sleeve 72, a first bearing assembly 74, a second bearing assembly 76, and a shaft collar 78. The example shaft seal system 54 comprises a shaft collar seal ring 80 and a shaft base seal ring 82. The example seal plate assembly 62 comprises a seal plate 90 and a gasket 92. The example heat shield 64, inner sleeve 72, first bearing assembly 74, and second bearing assembly 76, shaft collar seal ring 80, shaft base seal ring 82, and gasket 92 are or may be conventional and will not be described herein beyond that extent helpful to a complete understanding of the present invention The example housing 60 defines a bearing bore 120, at least one supporting groove 122, at least one locating groove 124, at least one oil inlet port 126, and at least one retention cavity 128. A longitudinal axis of the bearing bore 120 is substantially aligned with the system axis 22. The at least one supporting groove 122 extends at least partly along an annular path centered about the system axis 22, and each locating groove 124 is offset from and substantially parallel to the system axis 22. The at least one tab locating groove 124 intersects the at least one support groove 122. The example housing 60 defines a single, annular supporting groove 122 centered about the system axis, two locating grooves 124 located on opposite sides of the system axis 22, and two or more bolt cavities 128 configured to allow two or more seal plate bolts to secure the seal plate 90 in a desired position relative to the housing 60. The locating grooves 124 intersect the support groove at two separate locations.

The example retention cavity 128 is threaded to receive a bolt, but retention means other than a seal plate bolt 66 and threaded cavity 128 may be used in addition or instead. Examples of alternative retention means such as a threaded stud and nut, weldments, or the like may be used. The example retention cavity 128 will in any event be alternatively referred to herein as a bolt cavity 128.

The example outer sleeve 70 defines an outer sleeve passageway 130 and at least one support tab 132. The example outer sleeve 70 defines two support tabs 132.

The example shaft collar 78 defines shaft collar passageway 150, a bearing flange 152, a bearing surface 154, and a shaft collar seal ring groove 156.

The example seal plate 90 defines a seal plate passageway 160, at least one anti-rotation projection 162, a collar bearing surface 164, and at least one seal plate bolt opening 166. The example seal plate 90 defines two anti-rotation projections 162 and one seal plate bolt opening for each bolt cavity 128.

To assemble a turbocharger assembly comprising the example center housing rotating assembly 20, the shaft 34 is initially secured relative to the turbine wheel 30 such that the shaft 34 and turbine wheel 30 are rigidly connected. The shaft 34 and turbine wheel 30 may be integrally formed or may be formed separately and joined together. At this point, axial rotation of the turbine wheel 30 relative to the shaft 34 is substantially prevented.

The heat shield 64 is arranged at a lower end of the housing 60, and the shaft base seal ring 82 is arranged on the shaft base portion 40. The shaft 34 and turbine wheel 30 are then displaced such that the shaft 34 extends through the housing pan opening 176 and the bearing bore 120 and the turbine wheel 30 is adjacent to the heat shield 64. So arranged, the shaft base portion 40 is within the bearing bore 120, the shaft tip 42 extends out of the bearing bore 120, and the shaft axis 44 is substantially aligned with the system axis 22.

With the turbine wheel 30 and shaft 34 so arranged, the bearing system 52 and shaft seal system 54 are next formed. In particular, the second bearing assembly 76 is arranged such that the shaft 34 extends through the second bearing assembly opening 174 and the second bearing assembly 76 engages the shaft base portion 40. The inner sleeve 72 is then arranged such that the inner sleeve passageway 140 receives the shaft 34 and the inner sleeve 72 is in contact with the second bearing assembly 76.

The outer sleeve 70 is next arranged such that the outer sleeve passageway 130 receives the shaft 34 and the outer sleeve 70 is in contact with the second bearing assembly 76. In particular, the outer sleeve 70 is first angularly arranged such that the at least one support tab 132 is aligned with the at least one tab locating groove 124. The outer sleeve 70 is next displaced along the system axis 22 such that the at least one support tab 132 is at the same position along the system axis 22 as the supporting groove 122. The outer sleeve 70 is next axially rotated about the system axis 22 such that the at least one support tab 132 enters the supporting groove 122 and clears the at least one tab locating groove 124. At this point, the at least one support tab 132 is no longer within the at least one tab locating groove 124, and opposing inner surfaces of the housing 60 defining the supporting groove 122 are arranged to engage the at least one support tab 132 to inhibit movement of the outer sleeve 70 relative to the housing 60 along the system axis 22.

The shaft collar seal ring 80 is then arranged to be supported by the shaft collar piston ring groove 156, and the shaft collar 78 is arranged such that the shaft 34 extends through the shaft collar passageway 150 and the bearing surface 154 of the shaft collar 78 engages the first bearing assembly 74.

Figure 5:
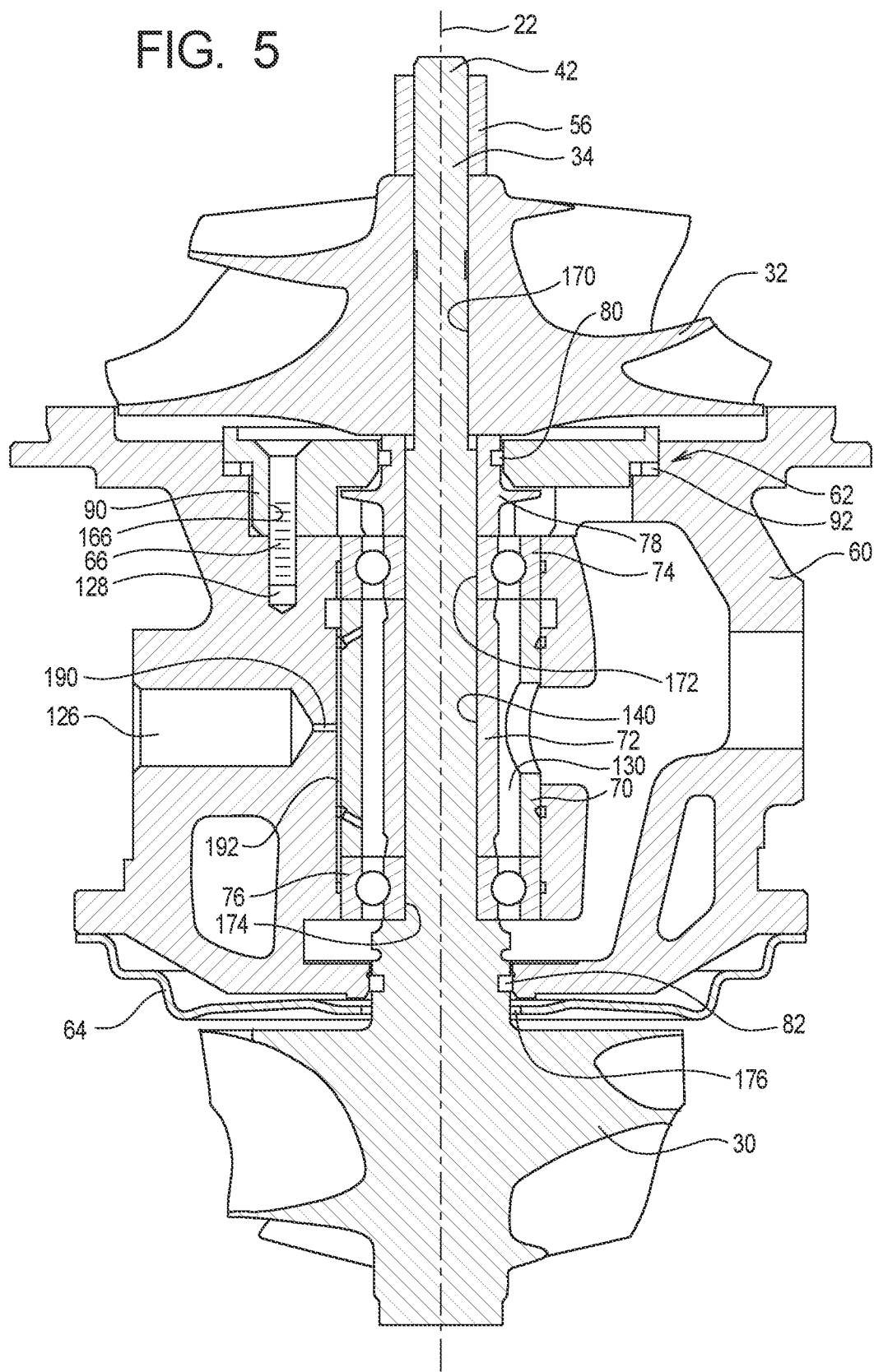
FIG. 5 is a section view taken along lines 5-5 in FIG. 1.
Figure 6:
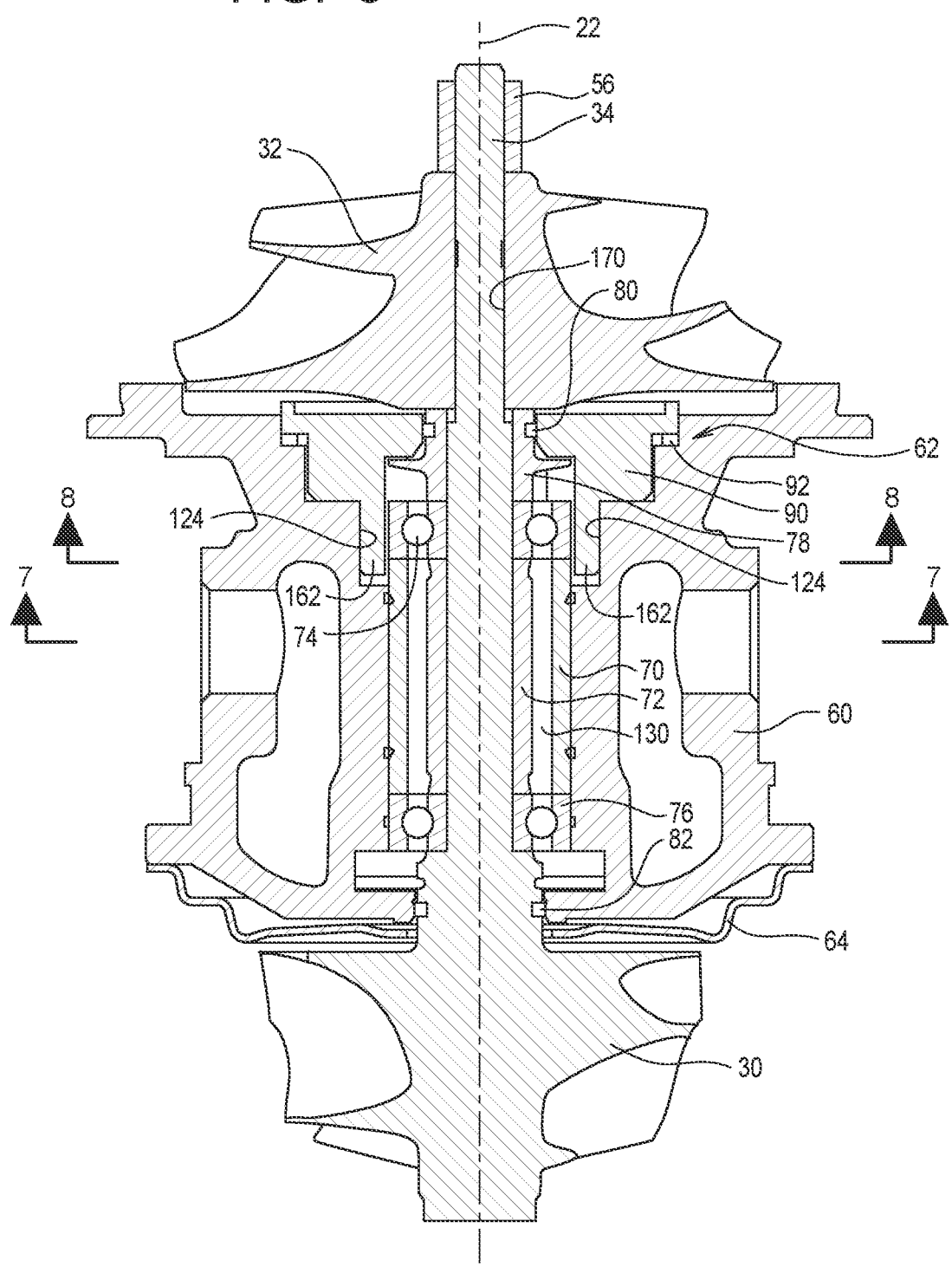
FIG. 6 is a section view taken along lines 6-6 in FIG. 2.
Figure 7:
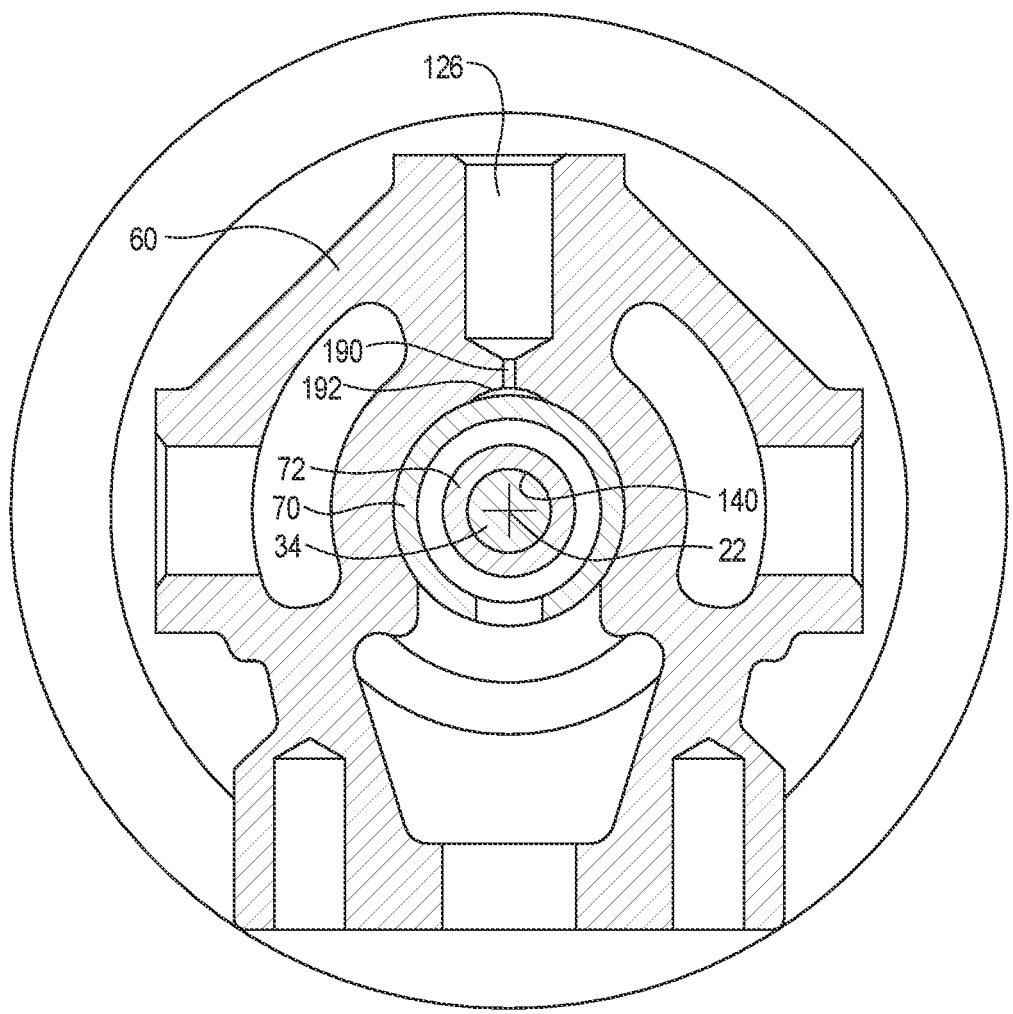
FIG. 7 is a section view taken along lines 7-7 in FIG. 6.
Figure 8:
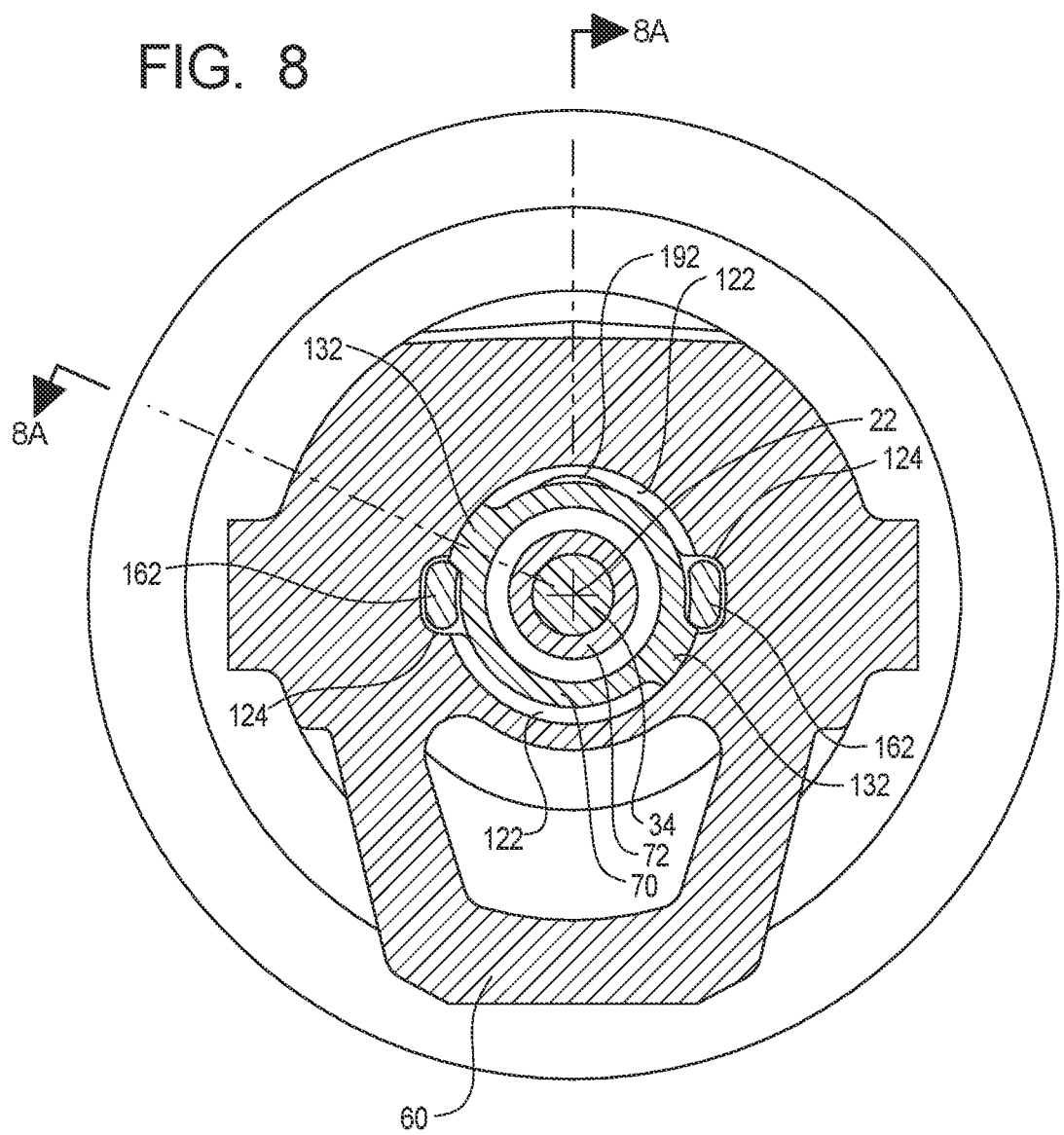
FIG. 8 is a section view taken along lines 8-8 in FIG. 6.
Figure 8A:
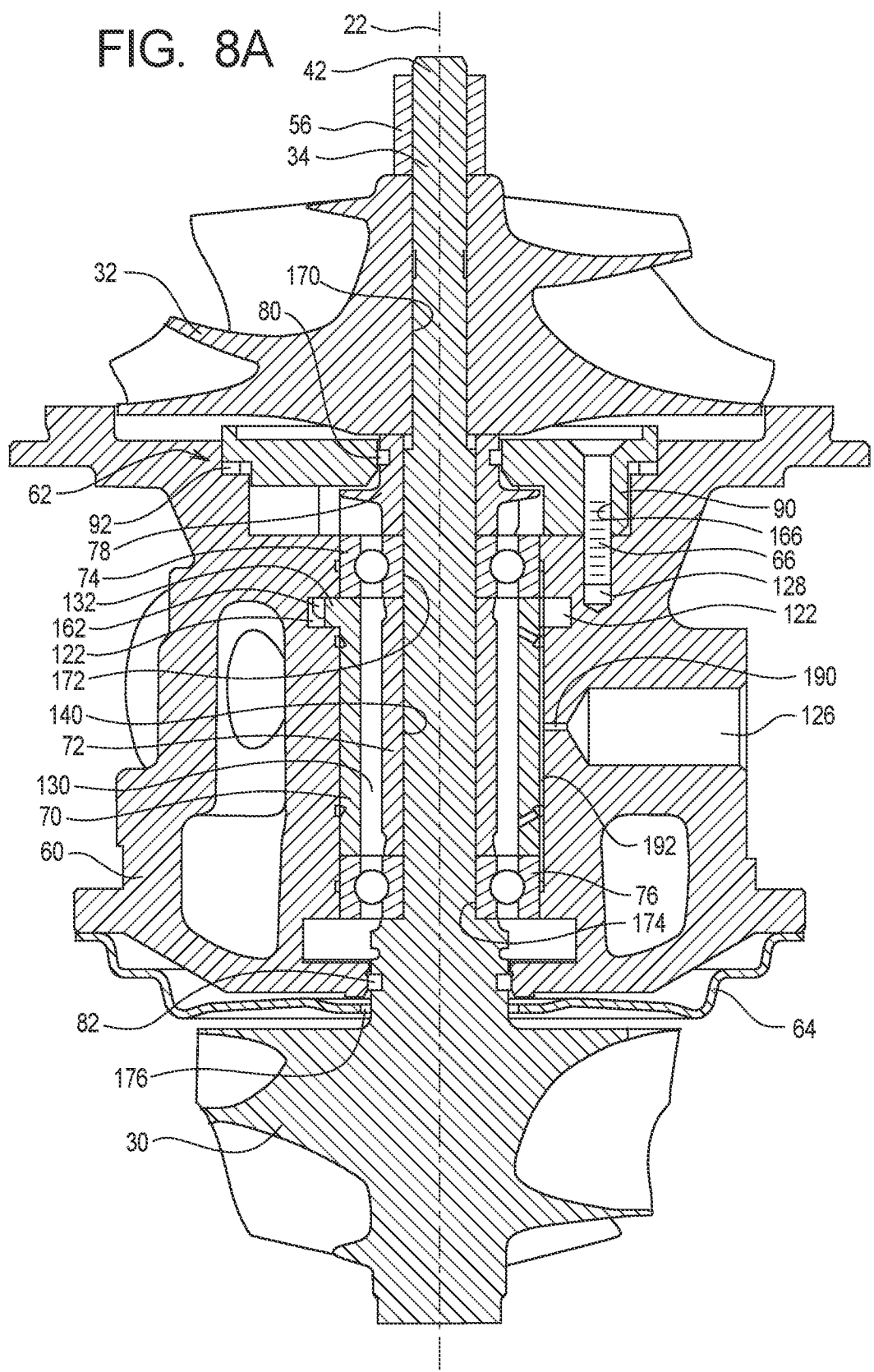

Next, the gasket 92 is arranged between the housing 60 and the seal plate 90, and the seal plate 90 is displaced such that the shaft 34 enters the seal plate passageway 160 and the collar guide surface 164 of the seal plate 90 engages the shaft collar seal ring 80 supported by the shaft collar seal ring groove 156. At this point, each anti-rotation projection 162 is arranged within a corresponding tab locating groove 124, and the seal plate bolt openings 166 in the seal plate 90 are aligned with the bolt cavities 128 in the housing. To secure the seal plate 90 to the housing 60, a seal plate bolt 66 is displaced through each seal plate bolt opening 166 and threaded into a corresponding bolt cavity 128. With the seal plate 90 secured to the housing 60, each anti-rotation projection 162 is arranged to engage a corresponding support tab 132 to inhibit axial rotation of the outer sleeve 70 relative to the housing 60. FIGS. 5, 6, and 8 illustrate the interactions among the supporting groove 122, tab entry slot(s) 124, support tab(s) 132, and anti-rotation projection(s) 162, while in FIGS. 9-10 the housing 60 is removed to illustrate the interactions between the support tab(s) 132 and anti-rotation projection(s) 162.

Next, the compressor wheel 32 is displaced such that the shaft 34 is arranged within the compressor wheel passageway 170. The shaft nut 56 is secured to the shaft tip 42 to fix the compressor wheel 32 to the shaft 34 such that axial rotation of the compressor wheel 32 relative to the shaft 34 is substantially prevented.

At this point, the shaft 34 transmits rotation of the turbine wheel 30 about the system axis 22 to the compressor wheel 32, and the support assembly 36 engages the shaft 34 to allow the turbine wheel 30, compressor wheel 32, and shaft 34 to be rotatably supported at a desired location relative to the exhaust stream 180 and intake stream 182 defined by the engine (not shown) with which the turbocharge assembly 20 is associated.

In addition, the example housing 60 is adapted to be connected to an oil supply system (not shown). In particular, the example oil inlet port 126 is sized, dimensioned, and configured to be connected to an oil supply system using conventional fittings and conduits. Further, the example oil inlet port 126 is formed with an integral flow restrictor 190 in the nature of a bore radially extending relative to the system axis 22 through the housing 60 to allow fluid communication with an oil chamber 192 defined within the housing 60. The example flow restrictor defines a cross-sectional area predetermined to control flow of oil through the oil inlet port 126 and into the oil chamber 192.

The example bearing system 52 is thus supported in a desired position along the system axis 22 relative to the housing 60 by the engagement of the two support tabs 132 with the supporting groove 122. This configuration provides improved axial support to the bearing system 52 through the use of a larger supporting surface area between the tabs 132 and the opposing surfaces defining the supporting groove 122. This configuration also provides improved bearing end play due to the improved bearing supporting system formed by the tabs 132 and the opposing surfaces defining the supporting groove 122. Further, because the support tabs 132 radially extend from one end of the example outer sleeve 70, the example outer sleeve 70 installs in only one direction. The outer sleeve 70 is thus inherently aligned through engagement with the seal plate 90 and thus does not require alignment. The seal plate 90 further functions as an anti-rotation system to prevent rotation of the outer sleeve 70.

The example center housing rotating assembly 20 provides a number of fabrication and assembly benefits.

The example housing 60 can be manufactured in only four operations and reduces machining costs, inspection costs, and assembly time and increases conformance rate. In particular, in a first operation a compressor side of the housing 60, with reference to Datum A & B, and the supporting groove 122 are turned on a lathe. In a second operation, a turbine side of the housing 60 is turned, also on a lathe. In a third operation, ports are milled. Ports such as the oil inlet port 126 do not require tight tolerances, so the milling process of the third operation does not require accurate fixture setups. In a fourth operation, the bearing bore 120 is honed to the correct size. The locating groove 124 is machined together with Datum A and B, which reduces tolerance stack up, and the reduced tolerance stack up allows larger tolerance. Further, the locating groove 124 may be machined in the lathe and does not require machining in a mill. The built in flow restrictor 190 eliminates components typical of conventional turbochargers such as a locating pin, crush washer, and custom oil feed line. Finally, inspection of the example housing 60 does not require use of a Coordinate Measuring Machine (CMM), thereby reducing inspection costs.

The example outer sleeve 70 can be manufactured in three operations that can be performed in multiple batches of outer sleeves 70 with one milling setup. In a first operation, the inner and outer diameters and the support tabs 132 are formed on a lathe. In a second operation, the example sleeve 70 is ground to the correct height. In a third operation, a profile of the support tab 132 is formed along with any holes required by function the example sleeve 70. The machining of the support tabs 132 during the initial lathe operation reduces tolerance stackup, which results in larger allowable tolerances. Further the tabs can be machined in the lathe and do not require separate setup of a milling process. Because of the reduction in setup and increase in tolerances, machining time is reduced. Further, machining the oil drain, feed hole, and tab profile in an single setup reduces fabrication costs. CMM is also not required with the example outer sleeve 70, and the conformance rate of the outer sleeve is improved. The fabrication process of the example outer sleeve 70 thus results in an increased production rate, a decrease in the number of required setups, reduced inspection costs, and ultimately in decreased product cost.

What is claimed is:

1. A support assembly for a turbocharger comprising a center housing rotating assembly defining a system axis, the support assembly comprising:
    a housing assembly comprising
       a housing defining at least one support groove, and
       a seal plate;
    a bearing assembly comprising an outer sleeve defining at least one support tab; whereby
    the at least one support tab is sized and dimensioned such that, when the outer sleeve is supported by the housing member in a desired orientation, the support tab is within the support groove such that movement of the outer sleeve along the system axis relative to the housing member is inhibited.

2. A support assembly as recited in claim 1, in which the seal plate defines at least one anti-rotation projection, where at least one the anti-rotation projection is sized and dimensioned such that, when the seal plate is secured to the housing member, the anti-rotation projection is arranged within the at least one tab locating groove to inhibit movement of the support tab relative to the housing member such that rotation of the outer sleeve about the system axis relative to the housing member is inhibited.

3. A support assembly as recited in claim 1, in which the outer sleeve defines at least one support tab, where each of the plurality of support tabs is sized and dimensioned such that, when the outer sleeve is supported by the housing member in a desired orientation, the plurality of support tabs are within the support groove.

4. A support assembly as recited in claim 1, in which the housing further defines at least one tab locating groove that intersects the at least one support groove.

5. A support assembly as recited in claim 4, in which:
    the at least one support groove is annular and centered about the system axis; and
    the at least one tab locating groove is offset from and substantially aligned with the system axis.

6. A support assembly as recited in claim 1, in which the seal plate defines at least one anti-rotation projection, where the at least one anti-rotation projection is sized and dimensioned such that, when the seal plate is secured to the housing member, the anti-rotation projection is arranged relative to the support tab to inhibit movement of the support tab relative to the housing member such that rotation of the outer sleeve about the system axis relative to the housing member is inhibited.

7. A support assembly as recited in claim 6, in which:
    the housing defines an annular support groove and first and second tab locating grooves;
    the outer sleeve defines first and second support tabs; and
    the seal plate defines first and second anti-rotation projections; whereby
    the first and second anti-rotation projections are arranged within the first and second tab locating grooves adjacent to the first and second support tabs, respectively.

8. A support assembly for a turbocharger defining a system axis, the support assembly comprising:
    a housing assembly comprising
       a housing defining at least one tab locating groove, and
       a seal plate defining at least one anti-rotation projection;
    a bearing assembly comprising an outer sleeve; whereby the at least one anti-rotation projection is sized and dimensioned such that, when the seal plate is secured to the housing member, the anti-rotation projection is arranged to inhibit movement of the outer sleeve relative to the housing member such that rotation of the outer sleeve about the system axis relative to the housing member is inhibited.

9. A support assembly as recited in claim 8, in which seal plate defines at least one anti-rotation projection, where the plurality of anti-rotation projections are sized and dimensioned such that, when the seal plate is secured to the housing member, each of the anti-rotation projections is arranged to inhibit movement of the outer sleeve relative to the housing member.

10. A support assembly as recited in claim 8, in which:
the outer sleeve comprises at least one support tab;
the at least one tab locating groove intersects at least one support groove formed in the housing; and
the at least one support tab is sized and dimensioned such that, when the outer sleeve is supported by the housing member in a desired orientation, the support tab is within the support groove such that movement of the outer sleeve along the system axis relative to the housing member is inhibited.

11. A support assembly as recited in claim 10, in which:
the at least one support groove is annular and centered about the system axis; and
the at least one tab locating groove is offset from and substantially aligned with the system axis.

12. A support assembly as recited in claim 10, in which the at least one the anti-rotation projection is sized and dimensioned such that, when the seal plate is secured to the housing member, the anti-rotation projection is arranged within the at least one tab locating groove to inhibit movement of the support tab relative to the housing member such that rotation of the outer sleeve about the system axis relative to the housing member is inhibited.

13. A support assembly as recited in claim 10, in which:
the housing defines an annular support groove and first and second tab locating grooves;
the outer sleeve defines first and second support tabs; and
the seal plate defines first and second anti-rotation projections; whereby
the first and second anti-rotation projections are arranged within the first and second tab locating grooves adjacent to the first and second support tabs, respectively.

14. A method of forming a support assembly for a turbocharger defining a system axis, the method comprising the steps of:
providing a housing;
forming at least one support groove in the housing,
providing a bearing assembly comprising an outer sleeve defining at least one support tab;
arranging the bearing assembly within the housing; and
securing a seal plate to the housing such that, when the outer sleeve is supported by the housing member in a desired orientation, the support tab is within the support groove and movement of the outer sleeve along the system axis relative to the housing member is inhibited.

15. A method as recited in claim 14, further comprising the step of forming at least one tab locating groove in the housing, where the tab locating groove intersects the at least one support groove.

16. A method as recited in claim 14, further comprising the steps of:
providing a seal plate defining at least one anti-rotation projection; and
arranging the anti-rotation projection relative to the support tab to inhibit movement of the support tab relative to the housing member such that rotation of the outer sleeve about the system axis relative to the housing member is inhibited.

17. A support assembly as recited in claim 14, in which the step of providing the bearing assembly comprises the step of providing a outer sleeve defining at least one support tab, where each of the plurality of support tabs is sized and dimensioned such that, when the outer sleeve is supported by the housing member in a desired orientation, the plurality of support tabs are within the support groove.

\* \* \* \* \*